United States Patent
Gauger et al.

(10) Patent No.: US 8,220,624 B2
(45) Date of Patent: Jul. 17, 2012

(54) FACIAL TISSUE PACK WITH MIRROR

(75) Inventors: Jeremy Thaddeus Gauger, Greenville, WI (US); Jason Robert Boon, Appleton, WI (US); Blake Adam Hondl, Dunwoody, GA (US); Richard Andre Hookong, Alpharetta, GA (US); Duane Lyle McDonald, Neenah, WI (US); William George Stoeger, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 283 days.

(21) Appl. No.: 12/647,691

(22) Filed: Dec. 28, 2009

(65) Prior Publication Data

US 2010/0252461 A1  Oct. 7, 2010

Related U.S. Application Data

(60) Provisional application No. 61/166,914, filed on Apr. 6, 2009.

(51) Int. Cl.
*B65D 71/00* (2006.01)

(52) U.S. Cl. ............... 206/233; 206/459.5; 206/494; 206/581

(58) Field of Classification Search ............ 206/205, 206/210, 233, 235, 459.5, 494, 581, 812, 206/823; 132/301, 316; 424/400–404
See application file for complete search history.

(56) References Cited

U.S. PATENT DOCUMENTS

| | | | |
|---|---|---|---|
| 2,720,208 A | 10/1955 | Gellman | |
| 4,785,970 A | 11/1988 | Engelmayer | |
| 5,247,395 A * | 9/1993 | Martinez | 156/229 |
| 5,261,570 A * | 11/1993 | Hippely et al. | 206/235 |
| 5,915,545 A | 6/1999 | Shackel et al. | |
| 5,984,089 A * | 11/1999 | Dotson | 206/210 |
| 6,065,843 A * | 5/2000 | Martinez, Sr. | 40/603 |
| 6,082,534 A * | 7/2000 | Dotson | 206/210 |
| 6,164,442 A | 12/2000 | Stravitz | |
| 6,383,504 B1 * | 5/2002 | Dotson | 424/402 |
| 6,681,780 B1 | 1/2004 | Baxter | |
| 7,237,677 B2 | 7/2007 | Berg | |
| D548,593 S | 8/2007 | Keberlein et al. | |
| D556,053 S | 11/2007 | Keberlein et al. | |
| 2004/0139703 A1 | 7/2004 | Abergel | |
| 2005/0067421 A1 | 3/2005 | Maldonado et al. | |

(Continued)

FOREIGN PATENT DOCUMENTS

EP  EM 000440433-0001 D  1/2006

(Continued)

OTHER PUBLICATIONS

Machine translation of an abstract for KR 20-1996-0030386 U titled, "The glass beads knot mote shoe cover where the nighttime reflective panel and the toilet rack mirror are affixed," published Oct. 22, 1996.
Machine translation of an abstract for KR 20-0306824 Y1 titled, "Portable [hyu] [ci] case," published Mar. 12, 2003.

*Primary Examiner* — Luan K Bui
(74) *Attorney, Agent, or Firm* — Michael J. Sullivan

(57) ABSTRACT

A flexible package, such as a facial tissue pocket pack, is provided with a rigid mirror, affixed to the package with an overlying adhesive label, to enable a user to clearly see his/her reflection.

11 Claims, 5 Drawing Sheets

U.S. PATENT DOCUMENTS

2006/0054517 A1    3/2006  Albert
2008/0034627 A1*   2/2008  Schnuckle .................... 40/306
2008/0095900 A1    4/2008  Berg
2008/0202952 A1*   8/2008  Rowe .......................... 206/494
2008/0277408 A1    11/2008 Rapala

FOREIGN PATENT DOCUMENTS

GB          2067817 D       2/1998

* cited by examiner

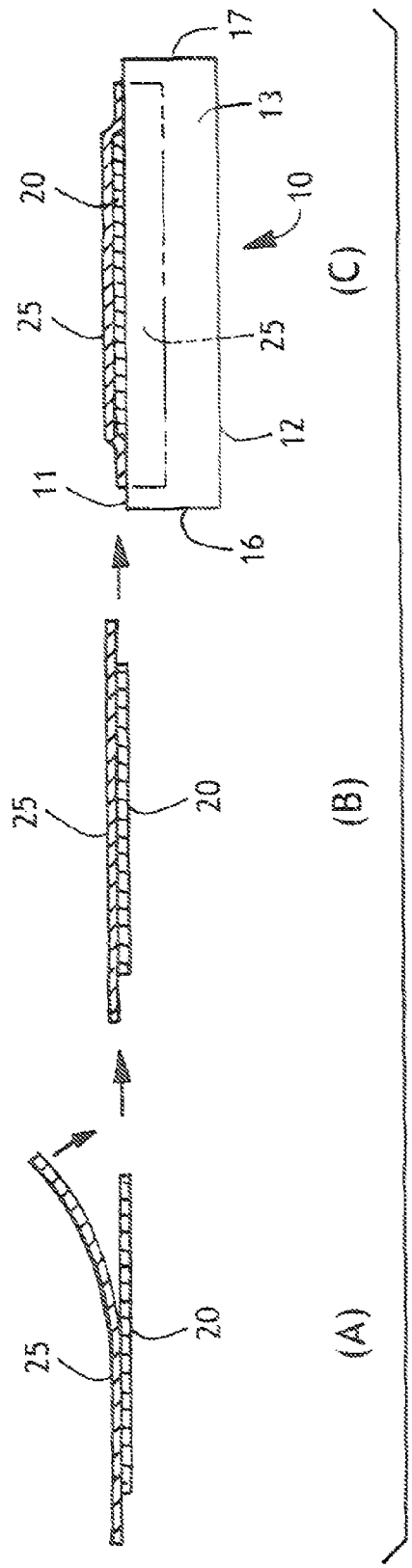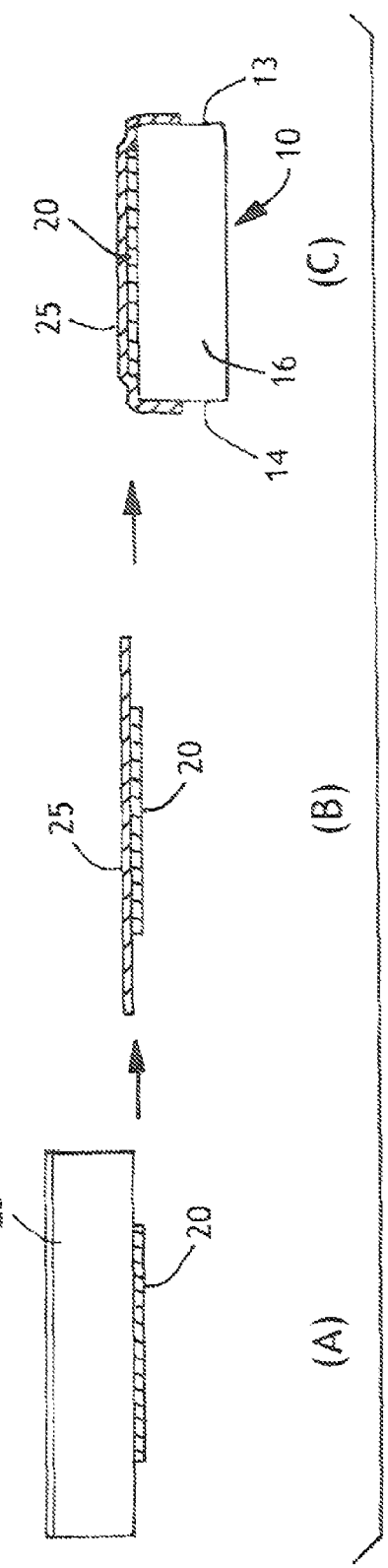

FACIAL TISSUE PACK WITH MIRROR

This application claims priority from presently U.S. Provisional Application No. 61/166,914 entitled "Facial Tissue Pack with Mirror" filed on Apr. 6, 2009, in the names of Jeremy Thaddeus Gauger et al.

BACKGROUND OF THE INVENTION

Soft tissue packages, such as pocket packs, are well known in the tissue industry. These products typically provide about five to twenty tissues, wrapped in a poly film, and are conveniently small enough to fit in one's pocket. They are commonly used for a wide variety of personal uses while the user is away from home. However, at such times a tissue user may also have a need for a mirror, which is often not available, in order to check their appearance. Therefore there is a need to further improve the convenience and functionality of such products.

SUMMARY OF THE INVENTION

It has now been discovered that soft portable facial tissue packages can be provided with an integrated reflective surface that provides a quality reflection so that the user can see themselves clearly. This new product synergizes the functional and emotional benefits of facial tissues and mirrors, including providing convenience and self-confidence. The package increases value to the user by enabling them to easily and quickly check their appearance on occasions where they are using facial tissues or any other time they have the portable facial tissue package with them. Use occasions particularly include after blowing one's nose, for makeup correction, looking at teeth after eating and removing oil/sweat from the face.

Hence in one aspect, the invention resides in a product comprising a plurality of facial tissues or other products, such as wipes, contained within a flexible plastic film wrapper, said wrapper having a rigid mirror attached to its outside surface by an adhesive label which adheres to the wrapper and at least partially covers and adheres to the mirror. The product provides the tissue user with a clear image without any exposed sharp mirror corners or edges, while still preserving the continuity of the overall package aesthetics.

In another aspect, the invention resides in a method of making a product with a mirror comprising: (a) adhering a transparent adhesive label to the reflective surface of a rigid mirror; and (b) adhering the mirror and the adhesive label to a front surface of a package of products, said package comprising a stack of tissues or wipes within a flexible plastic wrapper.

The rigid mirror can be constructed from a wide variety of materials/compositions known to be effective as a mirror, provided the mirror is sufficiently rigid as hereinafter described. By way of example, without limitation, metalized Mylar or other similar polyester materials with a thickness from about 0.01 to about 0.2 millimeters can be used. A thin film of aluminum can be deposited on one side using vacuum metallization, sputter metallization or electroplating, resulting in a thickness from about 80 to about 300 Angstroms. The resulting metalized film can be mounted on a rigid backing material using typical acrylic adhesives, for example. Suitable rigid backing materials include, without limitation, paperboard materials having a thickness from about 0.2 to about 0.8 millimeter, or polymeric materials, such as polystyrene, polyester, acrylic, polycarbonate or polypropylene having a thickness from about 0.01 to about 3 millimeters, depending upon the stiffness of the polymer. By way of example, without limitation, polymeric materials such as those described above that are electroplated with a thin layer of a metal, such as aluminum, can be used.

In addition, it is advantageous if the corners of the mirror are rounded, such as having a radius of curvature of about 1 millimeter or greater.

Suitable adhesive label materials include those that have visible transparency which allows the reflected image to be clearly visible to the user without creating a cloudy haze or translucent layer, yet still provide sufficient adhesion to keep the mirror in place on the tissue package. Adhesive-backed clear or transparent polymer films can be used, such as those made of Mylar®, polyester, polypropylene, polystyrene, or polycarbonate and having a thickness from about 0.01 to about 0.1 millimeter, more specifically from about 0.02 to about 0.05 millimeter. The adhesives used for the label can be water-based, rubber-based, or acrylic-based adhesives. An acrylic-based adhesive is particularly suitable due to its resistance to moisture and UV light and its transparent properties that allow the mirror image to be viewed through the adhesive layer. Suitable clear adhesive-backed labels are commercially available, for example, from WS Packaging Group, Inc., Green Bay, Wis.

It has been determined that reflective materials that bend relatively easily may provide a distorted reflective image that is insufficient to enable a user to adequately see the detail desired for purposes of self inspection. Therefore, for purposes herein, the mirror is advantageously relatively more rigid than the flexible plastic film wrapper, as determined by the Bending Force (hereinafter described). More particularly, the mirror can exhibit a Bending Force (expressed as Newtons/millimeter) of about 1.0 or greater, more specifically about 2 or greater, more specifically from about 2 to about 15, more specifically from about 2 to about 10, more specifically from about 3 to about 10, and still more specifically from about 5 to about 10.

The Bending Force is the load required to deflect a sample 1.0 millimeter as measured in accordance with ASTM Standard Test Method D 790-07, Procedure A, using a 3-point bending fixture with a 1-inch span. The bending fixture is an MTS model 642.01A, Assy. No 100028157, Rev. A with 0.25 inch diameter (3.2 mm radius) roller assemblies for the two supports and the nose. The fixture is mounted in an MTS tensile frame, model 1/G, with a 25N MTS load cell. The 3-point bending fixture, constant rate 1/G tensile tester and load cell are available from MTS Systems Corporation, 14000 Technology Drive, Eden Prairie, Minn. 55344-2290.

In preparing to carry out the test, five representative specimens are prepared by cutting each specimen to a length of 2 inches in the machine direction (long direction of the sample) and a nominal 0.5 inch in the cross direction (short dimension of the sample). Specimens are centered under the bending nose and the cross-head is manually positioned downward until a force of less than 1 gram is displayed, indicating that minimal nose contact was made with the specimen. This is preferred, as the force-deflection curves will start at zero. If contact is not made prior to the start of the test, the extension must be normalized to zero by shifting the output curve to the left by the amount of the offset and re-calculating the corresponding force. During the test, the load on the bending nose is increased until the specimen is deflected downwardly 1.0 millimeter. The force required to achieve a 1.0 millimeter deflection is the Bending Force, expressed in Newtons/millimeter. Each of the sample specimens is tested as described above and the average of the five tests is the average Bending Force.

For purposes herein, the reflectivity of the mirror should be sufficient for a user of the product to hold the product about a foot away from the user's face while perceiving facial features in sufficient detail to enable the user to perform the desired self inspection. While the rigidity of the mirror can be a factor in providing a quality reflected image, the reflected image quality of the mirror material can also be quantified by measuring the Distinctness-of-Image (DOI) and the 2° reflective gloss (haze), both measurements hereinafter described. In conducting these tests, the mirror sample is tested in a flat condition, so the rigidity of the sample is not taken into consideration. For example, a very flimsy mirror with good surface smoothness will test favorably when measured for DOI and 2° reflective gloss, but will perform poorly in use if adhered to a flexible package because the mirror will bend and the resulting image will become distorted. In general, the higher the DOI, the better the reflective image quality. On the other hand, the higher the 2° reflective gloss, which is a measure of the degree of light scatter, the poorer the reflective image quality.

The products of this invention can have a DOI of about 55 or greater, more specifically about 60 or greater, more specifically from about 55 to about 70, and still more specifically from about 55 to about 65. Alternatively, or in addition, the products of this invention can have a 2° reflective gloss of about 0.7 or less, more specifically from about 0.1 to about 0.7, more specifically from about 0.4 to about 0.7, and most specifically from about 0.5 to about 0.7.

The DOI measurement is conducted per ASTM D 5767-95, method A, using a specular gloss incident angle of 30° and ±0.3° off the specular angle. The 2° reflective gloss measurement is conducted per ASTM E 430-05, also method A. Both measurements can be carried out using a model 807A DOI/Haze meter available from TRICOR Systems, Inc, 1650 Todd Farm Drive, Elgin, Ill. 60123. The meter is calibrated with a front surface calibration mirror standard (used for metallics). A black glass standard is also available for calibrating the meter for measuring non-metallic surfaces. Both standards are also available from TRICOR Systems. Specular gloss, DOI, and 2° reflective haze are read directly from the 807A meter. There is no calculation required.

To carry out the testing for a particular mirror sample, the meter is placed down on the reflective surface of the mirror sample, such that the long dimension of the meter is parallel to the long dimension of the mirror sample. Two representative specimens of the mirror sample can be measured and five readings are taken per mirror specimen. The average of the measurements are the average DOI and average 2° reflective gloss for the mirror sample in question.

In the interests of brevity and conciseness, any ranges of values set forth in this specification contemplate all values within the range and are to be construed as written description support for claims reciting any sub-ranges having endpoints which are whole number or otherwise of like numerical values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5. Similarly, a disclosure in this specification of a range from 0.1 to 0.5 shall be considered to support claims to any of the following ranges: 0.1-0.5; 0.1-0.4; 0.1-0.3; 0.1-0.2; 0.2-0.5; 0.2-0.4; 0.2-0.3; 0.3-0.5; 0.3-0.4; and 0.4-0.5. In addition, any values prefaced by the word "about" are to be construed as written description support for the value itself. By way of example, a range of "from about 1 to about 5" is to be interpreted as also disclosing and providing support for a range of "from 1 to 5", "from 1 to about 5" and "from about 1 to 5".

BRIEF DESCRIPTION OF THE DRAWINGS

FIG. 5 is a schematic side view of a method of making the product of this invention, illustrating the application of the label to the face of the mirror and the wrapper.

FIG. 6 is a schematic end view of the method of FIG. 5.

DETAILED DESCRIPTION OF THE DRAWINGS

Referring to the various Figures, the invention will be described in greater detail.

Figure 1:
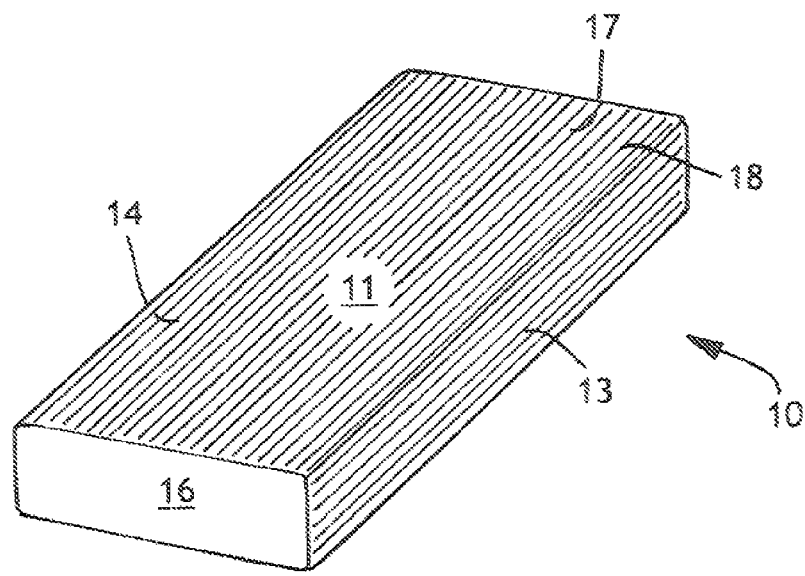
FIG. 1 is a perspective view of a typical "pocket pack" of facial tissues as is well known in the art, in which a small stack of facial tissues is contained within a flexible plastic film wrapper.

FIG. 1 is a perspective view of a conventional portable package of facial tissues, commonly referred to as a "pocket pack", which serves as a basis for the product of this invention. Shown is the tissue package 10 comprising a small stack of facial tissues contained within a flexible plastic film wrapper. For purposes herein, the tissue package has a front surface 11, an opposite back surface 12 (not visible in this view), two side surfaces 13 and 14, and two end surfaces 16 and 17. The plastic film wrapper contains decorative printed graphics, which in this case are a series of colored stripes 18.

Figures 2A, 2B:
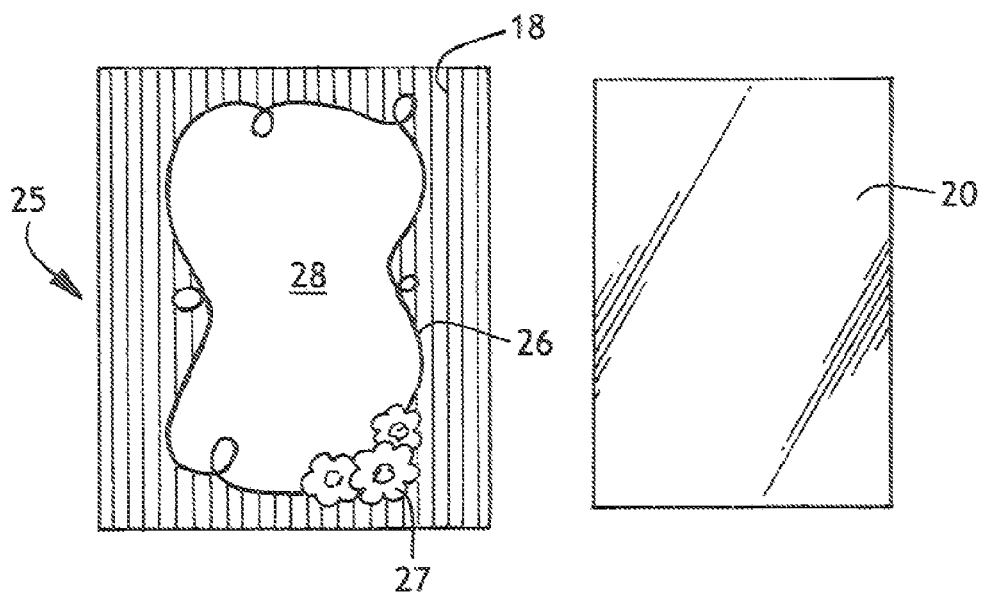
FIG. 2A is a plan view of a rigid mirror for use in accordance with this invention.
FIG. 2B is a plan view of an adhesive-backed "label" for use in accordance with this invention, illustrating a centrally-located large clear transparent area surrounded by a suitable graphic design.

FIG. 2A is a plan view of a rigid mirror 20 for use in accordance with this invention. The mirror is sized to fit within the edges of the front surface 11 of the facial tissue package of FIG. 1.

FIG. 2B is a plan view of an adhesive label 25 for use in accordance with this invention. The label is provided with graphics around the periphery that match or coordinate with the graphics of the tissue package to which the label is to be applied. In the embodiment shown, the tissue package of FIG. 1 contains colored stripes 18 and the label 25 also contains colored stripes 18. In general, the graphics on the label can be identical or otherwise complementary to the graphic pattern of the tissue package to which the label will be applied. The purpose is to camouflage the presence of the label after it is applied to the tissue package in order to avoid detracting from the overall aesthetics of the package graphics. As shown in FIG. 2B, the label also contains a decorative whimsical ribbon 26 and flowers 27, which serve to frame a large centrally located transparent portion 28 through which the mirror will reflect images. As previously described, the label is backed with a clear adhesive which will allow the underlying mirror to reflect a relatively clear image. In this regard, it is also within the scope of the invention to provide an adhesive label which only partially overlays the mirror surface, such as overlaying the mirror only around the edges of the mirror, so that the reflective surface of the mirror is uncovered over a majority of its surface. In the context of FIG. 2B, the clear transparent surface area 26 can be an opening or cut-out in the label 25. Advantageously, the adhesive label can have a decorative graphic pattern that covers all four edges of the mirror, such as is shown, so that the edges of the mirror are not visible. Masking the mirror edges in this manner provides an aesthetically pleasing effect.

Figure 3:
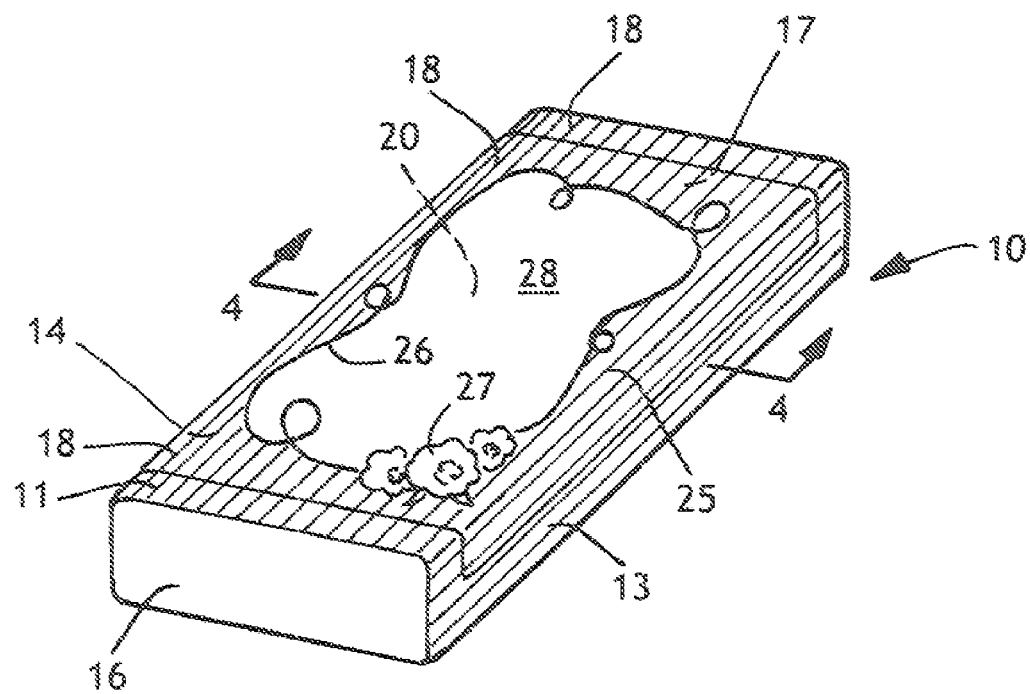
FIG. 3 is a perspective view of a tissue product in accordance with this invention, illustrating the label of FIG. 2A covering the mirror of FIG. 2B on the front face of the package of tissues of FIG. 1.

FIG. 3 is a perspective view of a product in accordance with this invention in which the mirror of FIG. 2A has been applied to the facial tissue package of FIG. 1 and adhered to the front of the package with the adhesive label of FIG. 2B. As shown, the graphics on the adhesive label mask the edges of the mirror 20, which is clearly visible through the optically clear portion 28 of the label 25. In addition, as shown, the striped graphics on the edges of the adhesive label blend with the striped graphics on the corresponding portions of the tissue package, so that the edges of the adhesive label are not readily noticeable to the user.

Figure 4:
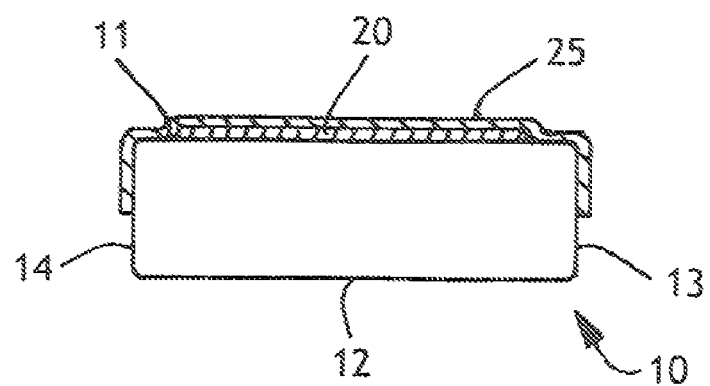
FIG. 4 is a cross-sectional end view along line 4-4 of FIG. 3, further illustrating the label over-laying the mirror and adhering to the sides of the package of tissues.

FIG. 4 is a cross-sectional view of the product of FIG. 3, further illustrating the manner in which the adhesive label 25 attaches the mirror 20 to the front surface 11 of the tissue package 10. As shown, the adhesive label completely covers the mirror and wraps around the sides 13 and 14 of the tissue package. The adhesive secures the adhesive label to both sides of the tissue package.

FIG. 5 is a schematic illustration of a method of applying the adhesive label to the mirror and to the tissue package, as viewed from the side of the package. As shown in FIG. 5A, the adhesive label is applied to the mirror with a gradual "rolling" type of contact, so that no air bubbles are trapped between the adhesive label and the reflective mirror surface. In fact, a roller can be used to promote good contact and adhesion. The presence of air bubbles can detract from the quality of the reflected image, which would be undesirable. FIG. 5B illustrates the adhesive label fully adhered to the mirror. As shown in FIG. 5C, which is a sectional view of the completed product, the adhesive label and the mirror are then fully attached to the tissue package. As shown, the adhesive label is longer than the mirror, so that the adhesive label adheres to the mirror and the front face of the tissue package in the areas beyond both ends of the mirror.

FIG. 6 is a schematic illustration of the same method as shown in FIG. 5, but viewed from the end of the tissue package. As shown, the sides of the adhesive label wrap over onto and adhere to both sides 13 and 14 of the tissue package.

Figure 7:
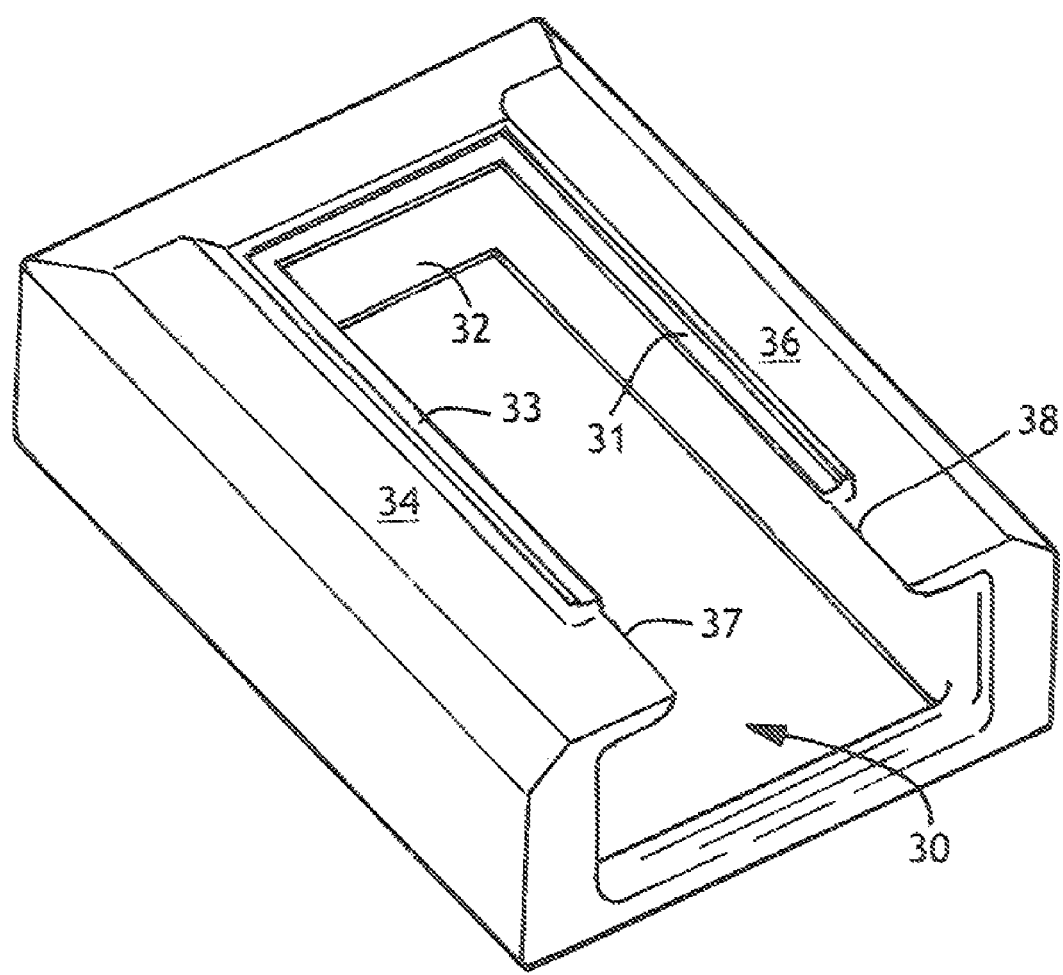
FIG. 7 is a perspective view of one piece of apparatus useful for making the products of this invention, referred to as a "puck", useful for applying the mirror and label to a tissue package.

FIG. 7 is a perspective view of a device, referred to herein as a "puck", which is useful for applying the mirror and the label onto a tissue package. As shown, the puck contains an open space 30 into which a facial tissue package is inserted with the front surface of the facial tissue package, to which the mirror is to be applied, facing up. The top side of the puck contains a ledge defined by surfaces 31, 32 and 33. The mirror is placed on surfaces 31, 32 and 33 with the reflective side of the mirror facing up. The adhesive label is then applied to the reflective surface of the mirror in the manner illustrated in FIGS. 5 and 6, which results in contact between the adhesive label and top surfaces 34 and 36 of the puck. These surfaces must be of a material or coating that does not allow the adhesive label to permanently adhere to them. Because the adhesive label is longer than the mirror, the adhesive label will contact and adhere to the tissue package in the area between edges 37 and 38. Thus, when the tissue package is removed from the space 30, the adhesive label and the attached mirror will travel with the tissue package. Once removed from the puck, the edges of the adhesive label can be wrapped around and adhered to the sides of the tissue package as illustrated in FIGS. 3, 4 and 6C.

Figure 8:
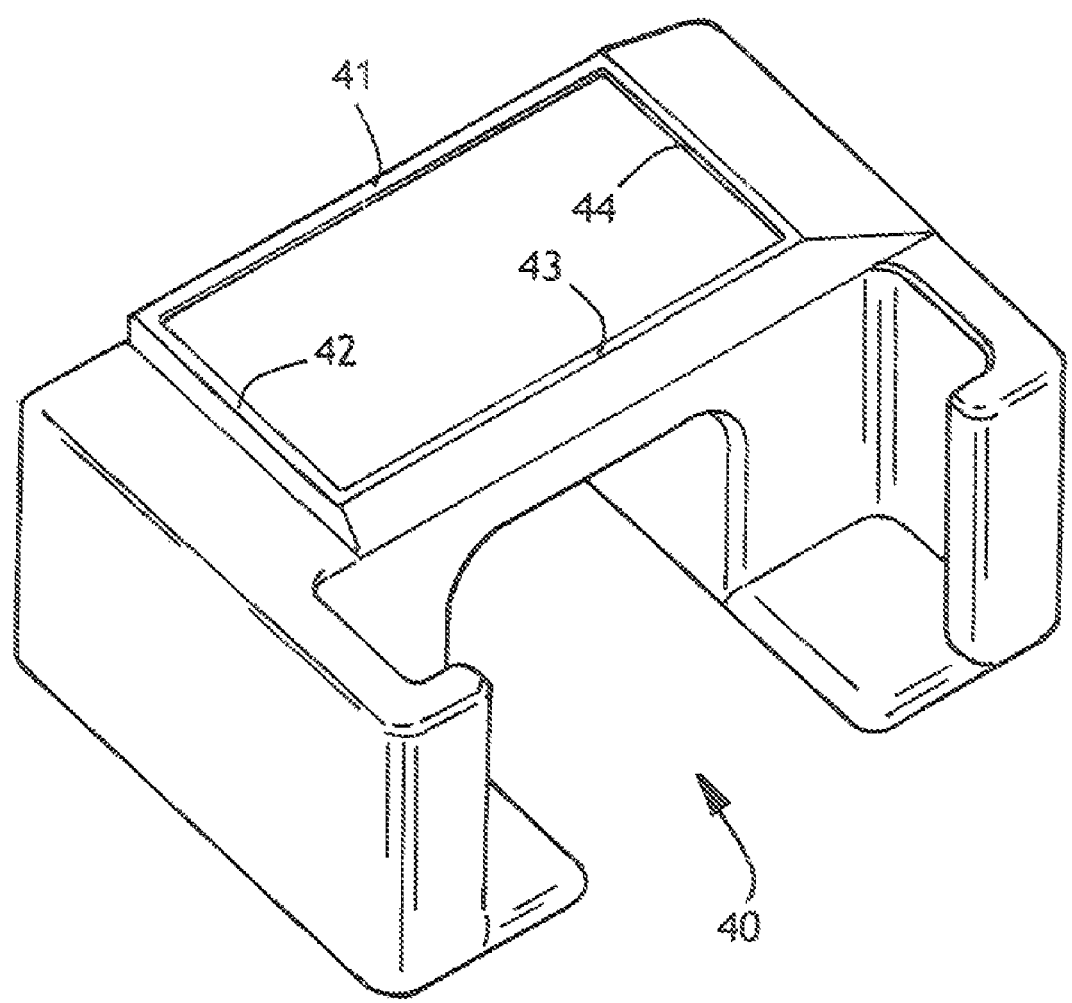
FIG. 8 is a perspective view of another puck design useful for applying the mirror and label to a tissue package.

FIG. 8 is a perspective view of another puck design which accomplishes the same result in a slightly different way. In particular, the tissue package is placed into the open space 40 of the puck such that the tissue package is on its side 14 with the front surface 11 facing inwardly toward the interior of the puck, the back surface facing outwardly from the puck and the side 13 facing up (see FIG. 4). The mirror is placed on the rectangular support surface defined by surfaces 41, 42, 43 and 44 with the reflective side of the mirror facing up. The adhesive label is applied to the mirror surface as described above, with the adhesive label extending beyond the surfaces 41 and 43 by an amount sufficient to ultimately extend at least partially down the sides of the tissue package. The portion of the adhesive label which extends beyond the support surface 43 is attached to the upwardly facing side surface 13 of the tissue package. The tissue package is then lifted upwardly, such that the mirror and the adhesive label drape across and adhere to the front surface of the tissue package. The remaining portion of the adhesive label is then wrapped around the opposite side of the tissue package (side surface 14) to complete attachment.

It will be appreciated that the foregoing description and drawings, given for purposes of illustration, are not to be construed as limiting the scope of this invention, which is defined by the following claims and all equivalents thereto.

We claim:

1. A product comprising a plurality of tissues or wipes contained within a flexible plastic film wrapper, said wrapper having a rigid mirror attached to an outside surface by an adhesive label which adheres to the wrapper and at least partially covers and adheres to the mirror.

2. The product of claim 1 wherein the label completely covers the mirror and has a centrally-located transparent portion.

3. The product of any one or more of the previous claims wherein the centrally-located transparent portion is adhered to the surface of the mirror.

4. The product of claim 1 wherein the label has a centrally-located cut-out which exposes the surface of the mirror.

5. The product of claim 1 wherein the wrapper contains decorative graphics and the label contains matching or complementary graphics such that the edges of the label are not readily noticeable by a casual observer.

6. The product of claim 5 wherein the decorative graphics cover the underlying edges of the mirror.

7. The product of claim 1 having a front surface, an opposing back surface, two opposing side surfaces and two opposing end surfaces, wherein the adhesive label adheres to the front surface and the two side surfaces.

8. The product of claim 1 wherein the rigid mirror has a flexural bending modulus that is greater than the flexural bending modulus of the flexible plastic film wrapper.

9. The product of claim 8 wherein the rigid mirror has a Bending Force of about 1.0 Newtons/millimeter or greater.

10. The product of claim 1 wherein the rigid mirror has a Distinctness-of-Image of about 55 or greater.

11. The product of claim 1 wherein the rigid mirror has a 2° reflective gloss of about 0.7 or less.

* * * * *